Dec. 1, 1925.  1,563,530
J. H. SAUNDERS
DEVICE FOR OVERCOMING THE BREAK OF GAUGE DIFFICULTY IN RAILWAYS
Filed Dec. 27, 1923
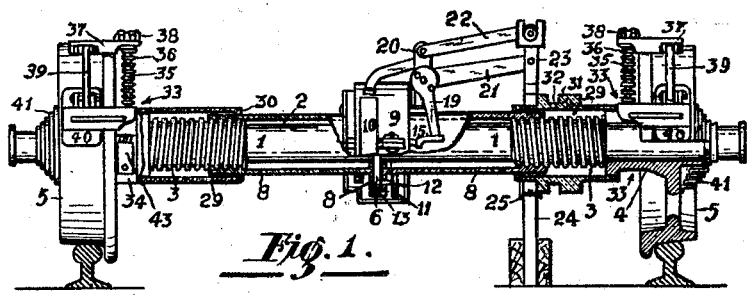
Fig. 1.
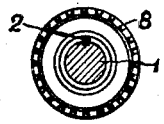
Fig. 5.
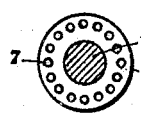
Fig. 4.
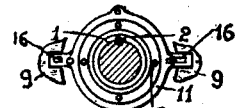
Fig. 3.
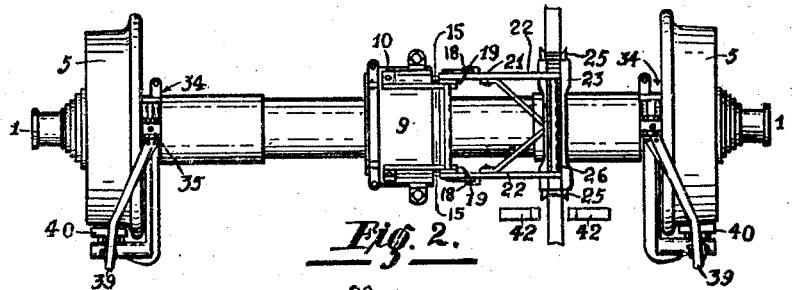
Fig. 2.
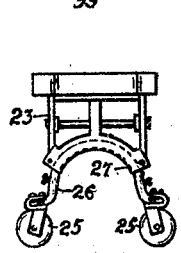
Fig. 8.
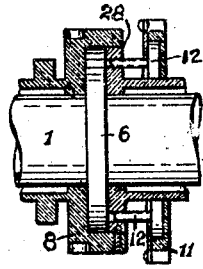
Fig. 7.
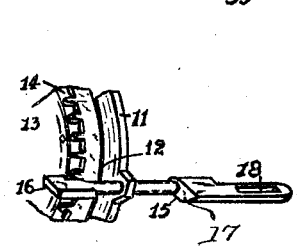
Fig. 6.
John Henry Saunders
INVENTOR;
By 
his Attorney.

Patented Dec. 1, 1925.

1,563,530

UNITED STATES PATENT OFFICE.

JOHN HENRY SAUNDERS, OF KILKENNY, SOUTH AUSTRALIA, AUSTRALIA

DEVICE FOR OVERCOMING THE BREAK-OF-GAUGE DIFFICULTY IN RAILWAYS.

Application filed December 27, 1923. Serial No. 682,876.

*To all whom it may concern:*

Be it known that I, JOHN HENRY SAUNDERS, a subject of His Majesty the King of Great Britain, residing at Kilkenny, South Australia, Commonwealth of Australia, have invented certain new and useful Improvements in a Device for Overcoming the Break-of-Gauge Difficulty in Railways, of which the following is a specification.

My invention relates to an improved device for overcoming the break of gauge difficulty in railways, the object of the same being to provide means whereby rolling stock, but more particularly freight trucks can be traversed from broad gauge to narrow gauge or vice versa as may be required.

I am aware that hitherto various devices have been invented for achieving the object above referred to but the majority of them have contained features which are considered dangerous.

In my invention the movement of the wheels whilst travelling over converging lines of rail is not dependent upon the action of such converging lines on the flanges of the wheels to secure the adjustment of the wheels upon the axles in adapting them to the altered gauge, and instead of the wheels rotating upon fixed axles as has been the case in some devices, the wheels with my invention rotate simultaneously with the axles and I am consequently able to permanently retain the ordinary axle boxes and brasses as at present in use.

The mechanism for adjusting the wheels consists principally of the arrangement of screws cut with right and left hand threads on a sleeve or extension of the hubs of the wheels which said sleeves surround the axles; and other sleeves having screw threads correspondingly cut to mesh with the screws previously mentioned, means being provided for locking one set of the sleeves so that when locked they become fixed and do not rotate and whilst so affixed cause the other rotating screws with which they engage to traverse inwardly or outwardly along the axles thereby adjusting the wheels with which they are associated to the required gauge. Automatic locking mechanism, dust guards, and extended bearings and subsidiary fittings are also provided.

But in order that my invention may be more clearly understood I will now describe the same by aid of the accompanying illustrative drawings wherein:—

Fig. 1 is a side elevation of the wheels, axles and fittings in part section.

Fig. 2 is a plan of Fig. 1.

Fig. 3 is a section through axle showing locking pins.

Fig. 4 section through axle adjacent to central fixed collar.

Fig. 5 section through axle adjacent to toothed locking collar.

Fig. 6 perspective view of portion of locking mechanism on larger scale.

Fig. 7 centre of axle showing surrounding parts in section.

Fig. 8 operating mechanism for lifting apparatus.

In each of the illustrations similar numerals of reference are used to denote similar or corresponding parts wherever they occur.

In the drawing 1 is the axle having journals at each end which are accommodated in ordinary axle boxes. At each end of the axle I cut a featherway 2 to enable the wheel to slide inwardly without rotating apart from the axle towards or outwardly from the centre to suit the required gauge, a screw threaded integral or attached extension 3 of the hub or nave 4 of the wheels 5 being adapted to also slide backwards or forwards on the feather together with the wheels. Upon the axle I construct a central fixed collar or flange 6 which is preferably made as an integral portion of the axle and through such collar or flange a number of holes 7 are drilled for purposes hereinafter explained.

Surrounding the axle and towards the middle thereof I mount two sleeves 8 on opposite sides of the central collar the outer ends of which are screw threaded so as to mesh with the right and left handed screw threaded portions of the nave extension or sleeves.

Around the centre of the axle I provide a non-rotating case 9 which may be secured to the underside of the truck and held by horns or guides extending therefrom (but not shown in the drawings) adapted to rest against the horn plates 10 and admit of vertical movement between the body of the truck and the axle within the range of the ordinary springs.

Within the non-rotating case I provide a sliding circular box 11 having projections on its periphery which fit into a simple slideway or guide within the case to render it non-rotating and within this box there is a freely rotating disc or washer plate 12 having pins or studs attached thereto which are adapted to fit into the holes 7 drilled in the middle fixed collar of the axle previously referred to, a locking collar 13 being attached to or constructed as an integral portion of one of the screw threaded sleeves 8. In its preferred form this collar is recessed to fit over or around the central fixed collar of the axle, a series of teeth 14 being cut in the periphery of the locking collar.

The locking collar also forms a union for the flanged end 28 of the opposite sleeve 8 the periphery of the latter being screwed into the recess of the former or otherwise securely fastened therein or thereto. In the drawings I have shown a convenient method of attaching these elements together, the ultimate object being to effectively unite them so that they act and move as one continuous screw threaded element.

Within a simple guide or slideway within the non-rotating case first mentioned I mount a locking device such for instance as a sliding locking bolt 15 having a lock end 16 adapted to fit into the teeth of the collar and having a thrust shoulder 17 for limiting the traverse of the bolt.

There are preferably at least two such locking bolts arranged one on either side of the case. The sliding lock bolt which is securely fastened by any convenient means to a projection on the periphery of the sliding box 11 is formed with a lever slot 18 for the accommodation of automatic adjusting levers such as the thrust levers 19 which may be pivoted to a vertical pillar 20 which for convenience is supported upon the non-rotating case 9. The locking bolt is securely attached to the non-rotating sliding box 11 which carries the studded disc 12. Accordingly, movement of the bolt 15 will move the box 11 and the disc 12 in an axial direction. Movement in one direction will simultaneously cause the lock 16 of the bolt to be released from the peripheral teeth 14 of the collar 13 and the pins of disc 12 to pass into the holes of the middle axle flange 6, whereby the screw-ended central sleeve 8–8 is locked to the axle and hence rotates therewith. Movement of the bolt in the opposite axial direction will simultaneously withdraw the pins from the flange 6 and insert the lock 16 into one of the peripheral teeth 14, whereby the sleeve 8—8 will be held stationary.

Levers 21 and parallel links 22 or mechanical equivalents thereof are pivotally connected to a lifting frame 23 which is adapted to be lifted by a length of bevel ended rail 24 located between the track rails in alignment with the antifriction guide wheels 25 which are mounted upon a flexible or adjustable support such as an arcuately moving curved bar 26 slidably fitted within an arcuate frame or saddle 27 and the bar may be limited in its traverse by pins or stops. The arcuate frame 27 is attached to the lifting frame 23 previously referred to and is capable of operating the parallel levers.

The inner end of one of the screw threaded sleeves 8 is flanged at 28 as previously stated and through the flanged portion 28 which lies adjacent to the central fixed collar 6 holes are drilled into which the pins of the rotatable washer plate are slidably fitted.

Surrounding the screw threaded portions of the structure I provide at each end a dust excluding sleeve 29 which rotates with the screw threaded portion, the inner ends of the sleeves being inturned at 30 so that in addition to acting as dust shields these sleeves will retain lubricant.

Upon the dust excluding sleeve 29 which is adjacent to the lifting lock frame 23 I construct an enlargement 31 which acts as a lock control collar, a space or recess 32 being cut therein as illustrated. In the accompanying drawing my invention is shown as adapted for example to the requirements of the three recognized standard gauges of rails as used in Australia, namely 3 ft., 6 inches; 4 ft., 8½ inches; and 5 ft., 3 inches.

The distances between the outside or ends of the enlarged portion and the intermediate space or gap in the collar represent the adjustments for the aforesaid gauges. The length of the intermediate rail and the pitch of the screw mechanism in conjunction with the converging or diverging track rails are all proportioned so that the release of the locking mechanism and the traverse of the wheels harmonize with the desired change of gauge.

Inside of each wheel and adjacent thereto I provide an additional turned bearing surface 33 which supports a saddle or frame 34. An oil box is included in this structure as indicated at 43, and above the saddle I arrange a telescopic pillar 35 round which there is a supplemental spring 36 which rests beneath the upper bearing frame 37 said frame having a mounting thereon at 38 for roller bearings to reduce the friction when the device is being traversed transversely inwardly and outwardly on rails or bearings which are fitted to the underside of the truck. Upon this frame I mount the brake arm or bracket 39 which supports the brake block 40. The end of the brake arm or bracket is also supported adjustably from the underside of the truck so that the brake block travels inwardly or outwardly from the centre and is therefore always opposite to the face of the wheels.

From the body of the truck and extending in a downward direction I arrange two rods or guard plates. The position of these plates is shown by the numeral 42 in Fig. 2 of the drawings. They are a fixture to the truck and extend downwardly so that the bevel ended rail which operates the lever mechanism lies between the intermediate space and by this means any obstruction which may have been placed on such rail is effectively removed by the traverse of the truck.

In describing my invention I have made provision for the automatic movements of the parts by aid of the intermediate or trip rail, but by mounting a hand lever on the body or frame of the vehicle and suitably connecting it with the operative parts it will readily be understood that the locking or releasing of the control mechanism can be effected by manual labour.

To the outside of the wheels I attach a series of cylinders 41 of diminishing diameter. These are internally flanged to bear on the axle and are arranged so as to telescope together when the wheels are on the broadest gauge but extend outwardly from the hub to the journal when the wheels are drawn together towards the centre so as to protect the axle which would otherwise be exposed to dust and weather.

In applying my invention to practical use, when the gauge is to be altered the locking bolt or bolts 15 are operated upon by the thrust lever 19 and associated mechanism, which is elevated by the contact of the guide wheels 25 with the intermediate rail thus withdrawing the pins of disc 12 from the middle flange 6 and immediately they are clear inserting the lock 16 in the toothed periphery 14 of the locking collar 13 so that by the non-rotation of the set of screw threaded sleeves 8—8 and the rotation of the sleeves 3 connected with the wheels with which they engage the wheels slide inwardly or outwardly according to the direction in which the truck is travelling. As soon as the truck has passed over the intermediate rail 24 and the screw threaded sleeves acting together on the nut and bolt principle have operated sufficiently to adjust the wheels to the required gauge the lever mechanism 23 drops and reverses the position of the locking bolt 15 thereby removing the lock 16 from the teeth 14 and reinserting the pins in the centre collar 6 so that the parts in their readjusted position again rotate in unison. This action takes place whilst the vehicle is passing between converging or diverging rails from one gauge to another and it is between this part of the track that the intermediate trip rail 24 is secured.

Instead of the whole weight of the truck and load being carried by the outer axle boxes a portion of the weight is transmitted through the telescopically mounted springs to the bearing surface provided immediately adjacent to the inner side of the wheels and by the aid of the laterally moving frame 37 which traverses simultaneously with the change of gauge the brake blocks 40 are always in the correct position in relation to the wheels. The brake hangers or brackets are likewise adjustably attached to the underside of the body of the truck and are subject to the same lateral movement.

What I claim is:

1. In break of gauge mechanism of the character described, in combination, an axle, wheels splined thereon, means for moving the wheels in axially opposite directions, and means for normally holding said first named means in inoperative position and for simultaneously releasing said first named means and locking it in operative position.

2. In break of gauge mechanism of the character described, in combination, an axle, wheels splined thereon, complementary internally and externally threaded sleeves carried by the axle and the wheels respectively, and means for normally locking the axle sleeve to the axle and for simultaneously releasing said sleeve and holding it stationary.

3. In break of gauge mechanism of the character described, the combination of elements as set forth in claim 2, said means including a flange on said axle and having axial bores, said axle sleeve having bores adapted to register with said first named bores, and pins removably insertible through both sets of bores to lock the sleeve to the axle.

4. In break of gauge mechanism of the character described, the combination of elements as set forth in claim 2, said means including a set of teeth on said axle sleeve, and at least one non-rotatable locking member movable into and out of engagement with said teeth.

5. In break of gauge mechanism of the character described, in combination, an axle, wheels splined thereon, externally and oppositely threaded sleeves connected to the wheels and embracing the axle between the wheels, a central sleeve embracing the axle and internally threaded to simultaneously engage with the threads of both the first sleeves, means cooperating with the axle for normally locking the central sleeve to the axle whereby all the sleeves will rotate with the axle, and means for simultaneously disconnecting the central sleeve from the axle and holding it stationary whereby relative rotation of the sleeves will cause the outer sleeves to move in opposite axial directions.

6. In break of gauge mechanism, the combination of elements as set forth in claim 5, the axle having a flange having circumferentially disposed axial bores, the central sleeve having a flanged portion constituting an internal groove adapted to fit around the axle flange, one wall of said flanged portion having axial bores disposed along a circular arc to align with the first named bores, and said first named means comprising a disc rotatably mounted on the central sleeve and having projecting pins slidably disposed in the second named bores, a non-rotatable casing for said disc slidably mounted on the sleeve, and means for axially moving said casing to removably insert the pins into the bores in the axle flange to lock the latter to the flanged portion of the sleeve.

7. In break of gauge mechanism, the combination of elements as set forth in claim 5, the axle having a flange having circumferentially disposed axial bores, the central sleeve having a flanged portion constituting an internal groove adapted to fit around the axle flange, one wall of said flanged portion having axial bores disposed along a circular arc to align with the first named bores, and said first named means comprising a disc rotatably mounted on the central sleeve and having projecting pins slidably disposed in the second named bores, a non-rotatable casing for said disc slidably mounted on the sleeve, and means for axially moving said casing to removably insert the pins into the bores in the axle flange to lock the latter to the flanged portion of the sleeve, said flanged portion having peripheral teeth, and said second named means comprising at least one locking arm carried by the casing and movable into engagement with said teeth when the casing is moved axially to withdraw the pins from the bores in the axle flange.

8. In break of gauge mechanism of the character described, in combination, an axle, wheels splined thereon, rails for said wheels, means cooperating with said wheels and axle for axially moving the wheels, an inclined rail between said first named rails, and means cooperating with said inclined rail for setting said first named means into operation.

9. In break of gauge mechanism of the character described, in combination with the elements as set forth in claim 8, additional means for automatically disconnecting said first named means and locking said wheels in relative axial position when said second named means has ceased to operate.

10. In break of gauge mechanism of the character described, the combination of elements as set forth in claim 8, said second named means comprising a frame operatively connected with the first named means and movable to set the latter into operation, said frame being adapted to engage with said inclined rail to be moved by said engagement.

11. In break of gauge mechanism of the character described, the combination of elements as set forth in claim 8, said second named means comprising a frame straddling the axle and movable to set said first named means into operation, and arcuately movable wheels carried by said frame and adapted to engage with said inclined rail to lift the frame.

12. In break of gauge mechanism of the character described, in combination, an axle, wheels splined thereon, rails for said wheels, means cooperating with said wheels and axle for axially moving the wheels, an inclined rail between said first named rails, means cooperating with said inclined rail for setting said first named means into operation, and means for automatically disconnecting said first named means and locking said wheels in relative axial position when said second named means has ceased to operate, said last named means comprising a sleeve carried by one wheel and provided with spaced flanges and cooperating with said second named means.

13. In break of gauge mechanism of the character described, the combination of elements as set forth in claim 12, said second named means comprising a frame liftable to set said first named means into operation and straddling said sleeve adjacent to one of said flanges, said frame being adapted to engage with said inclined rail to be lifted out of contact with said sleeve to allow axial movement of the wheel.

14. In break of gauge mechanism of the character described, in combination, an axle, wheels splined thereon, complementary externally and internally threaded sleeves carried by the wheels and axle respectively, and dust excluding sleeves carried by the wheels and embracing the threaded sleeves carried by the wheels.

15. Break of gauge mechanism as claimed in claim 14, said dust excluding sleeves have inwardly disposed flanges at their inner ends to form a chamber adapted to contain a lubricant.

16. In break of gauge mechanism of the character described, in combination, an axle, wheels splined thereon, complementary externally and internally threaded sleeves carried by the wheels and axle respectively, means for causing cooperation between said sleeves to cause axial movement of the wheels, and telescopically movable complementary sleeves cooperating with the wheels and the axle to enclose the portions of the axle exposed by said axial movement.

In testimony whereof I have affixed my signature.

JOHN HENRY SAUNDERS.